(12) United States Patent
Jang et al.

(10) Patent No.: US 7,933,873 B2
(45) Date of Patent: Apr. 26, 2011

(54) HANDLING TRANSFER OF BAD DATA TO DATABASE PARTITIONS IN RESTARTABLE ENVIRONMENTS

(75) Inventors: Jing-Song Jang, Cupertino, CA (US); Wing Yun Mak, Campbell, CA (US); James Michael McArdle, Austin, TX (US); Michael John Elvery Spicer, Lafayette, CA (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 12/015,836

(22) Filed: Jan. 17, 2008

(65) Prior Publication Data
US 2009/0187608 A1   Jul. 23, 2009

(51) Int. Cl.
*G06F 17/30* (2006.01)
(52) U.S. Cl. .................................. 707/642; 707/669
(58) Field of Classification Search .................. 707/609, 707/638, 642, 669, 684; 714/1, 2, 38, 39, 714/699
See application file for complete search history.

(56) References Cited

U.S. PATENT DOCUMENTS

| | | | |
|---|---|---|---|
| 6,240,442 B1 | 5/2001 | Domenikos et al. | |
| 6,480,941 B1 | 11/2002 | Franke et al. | |
| 6,662,307 B1 * | 12/2003 | Sipple et al. | 714/2 |
| 6,681,348 B1 * | 1/2004 | Vachon | 714/45 |
| 6,845,384 B2 | 1/2005 | Bamford et al. | |
| 6,895,487 B2 | 5/2005 | Thusoo et al. | |
| 6,898,608 B2 | 5/2005 | Hopeman et al. | |
| 7,028,056 B1 * | 4/2006 | Hendel et al. | 1/1 |
| 7,149,929 B2 * | 12/2006 | Chaurasia | 714/38 |
| 7,237,139 B2 | 6/2007 | Hamilton, II et al. | |
| 7,490,268 B2 * | 2/2009 | Keromytis et al. | 714/38 |
| 2002/0049815 A1 | 4/2002 | Dattatri | |
| 2002/0161778 A1 | 10/2002 | Linstedt | |
| 2003/0084142 A1 | 5/2003 | Casati et al. | |
| 2003/0115207 A1 | 6/2003 | Bowman et al. | |
| 2004/0243618 A1 | 12/2004 | Malaney et al. | |
| 2004/0267835 A1 | 12/2004 | Zwilling et al. | |
| 2004/0268244 A1 | 12/2004 | Levanoni et al. | |
| 2006/0010180 A1 | 1/2006 | Kawamura et al. | |
| 2006/0123204 A1 | 6/2006 | Brown et al. | |
| 2006/0136354 A1 | 6/2006 | Bell et al. | |
| 2007/0011167 A1 | 1/2007 | Krishnaprasad et al. | |
| 2007/0033281 A1 * | 2/2007 | Hwang et al. | 709/224 |
| 2008/0091714 A1 | 4/2008 | Idicula et al. | |
| 2009/0187787 A1 | 7/2009 | Jang et al. | |
| 2009/0187917 A1 | 7/2009 | Jang et al. | |

OTHER PUBLICATIONS

Office Action history of pending U.S. Appl. No. 12/016,039, dates ranging from Jun. 10, 2010—Nov. 17, 2010.

* cited by examiner

*Primary Examiner* — Cam-Linh Nguyen
(74) *Attorney, Agent, or Firm* — Patterson & Sheridan, LLP

(57) ABSTRACT

Method, computer program product, and system for transferring data to database partitions are provided. A transaction is initiated to insert one or more records into a partition of a database. At least one of the one or more records is then saved in binary form to a dump table in the database as a part of the transaction in response to the insertion of the at least one record into the partition having failed as a result of the at least one record not satisfying a predetermined condition. In response to the saving of the at least one record in binary form to the dump table having failed, the transaction is rolled back.

20 Claims, 5 Drawing Sheets

HANDLING TRANSFER OF BAD DATA TO DATABASE PARTITIONS IN RESTARTABLE ENVIRONMENTS

CROSS-REFERENCE TO RELATED APPLICATIONS

The present application is related to co-pending U.S. patent application Ser. No. 12/016,039, entitled "Transfer of Data From Positional Data Sources to Partitioned Databases in Restartable Environments" and co-pending U.S. patent application Ser. No. 12/016,092, entitled "Transfer Of Data From Positional Data Sources To Partitioned Databases In Restartable Environments", both of which are filed on even date herewith and co-assigned to the assignee of the present application. All of which is incorporated herein by reference.

BACKGROUND

Data transferred to a partitioned database is not always successfully inserted into the partitioned database. For example, data that is of a wrong data type, that fails to satisfy a table constraint, or the like may be prevented from being inserted into the partitioned database. If data is being transferred to the partitioned database in a restartable environment, then there will need to be safeguards to prevent any data not successfully inserted into the partitioned database from being lost or duplicated in the event of a restart.

SUMMARY

Method, computer program product, and system for transferring data to database partitions are provided. In one implementation, a transaction is initiated to insert one or more records into a partition of a database. At least one of the one or more records is then saved in binary form to a dump table in the database as a part of the transaction in response to the insertion of the at least one record into the partition having failed as a result of the at least one record not satisfying a predetermined condition. In response to the saving of the at least one record in binary form to the dump table having failed, the transaction is rolled back.

DETAILED DESCRIPTION

This disclosure generally relates to handling transfer of bad data to database partitions in restartable environments. The following description is provided in the context of a patent application and its requirements. Accordingly, this disclosure is not intended to be limited to the implementations shown, but is to be accorded the widest scope consistent with the principles and features described herein.

Data transferred to partitioned databases sometimes include "bad" data. Data is "bad" when, for instance, the data is of a wrong data type, fails to satisfy a table constraint, does not convert into a correct format, is not linked to a reference, or the like. To give an example, suppose data to be inserted (e.g., written) into a partitioned database is of one data type. If the partitioned database is defined such that data of the one data type cannot be inserted into the partitioned database, then any attempts to insert the data into the partitioned database will fail.

To given another example, suppose data to be inserted into a table of a partitioned database is 12 characters long. If a constraint on the table specifies that data cannot be more than 10 characters in length, then any attempts to insert the data into the table will fail. To give a further example, suppose data to be inserted into a partitioned database should convert into a date format. If the data converts into something that cannot possibly correspond to a date (e.g., month 13, day 37, and so forth), then any attempts to insert the data into the partitioned database will fail.

The transfer of data may be occurring in a restartable environment (e.g., an environment capable of automatically restarting where things left off when failure occurred). With a restartable environment, "bad" data must be handled in such a way that "bad" data is not lost or duplicated when there is a restart or recovery after a failure.

Figure 1:
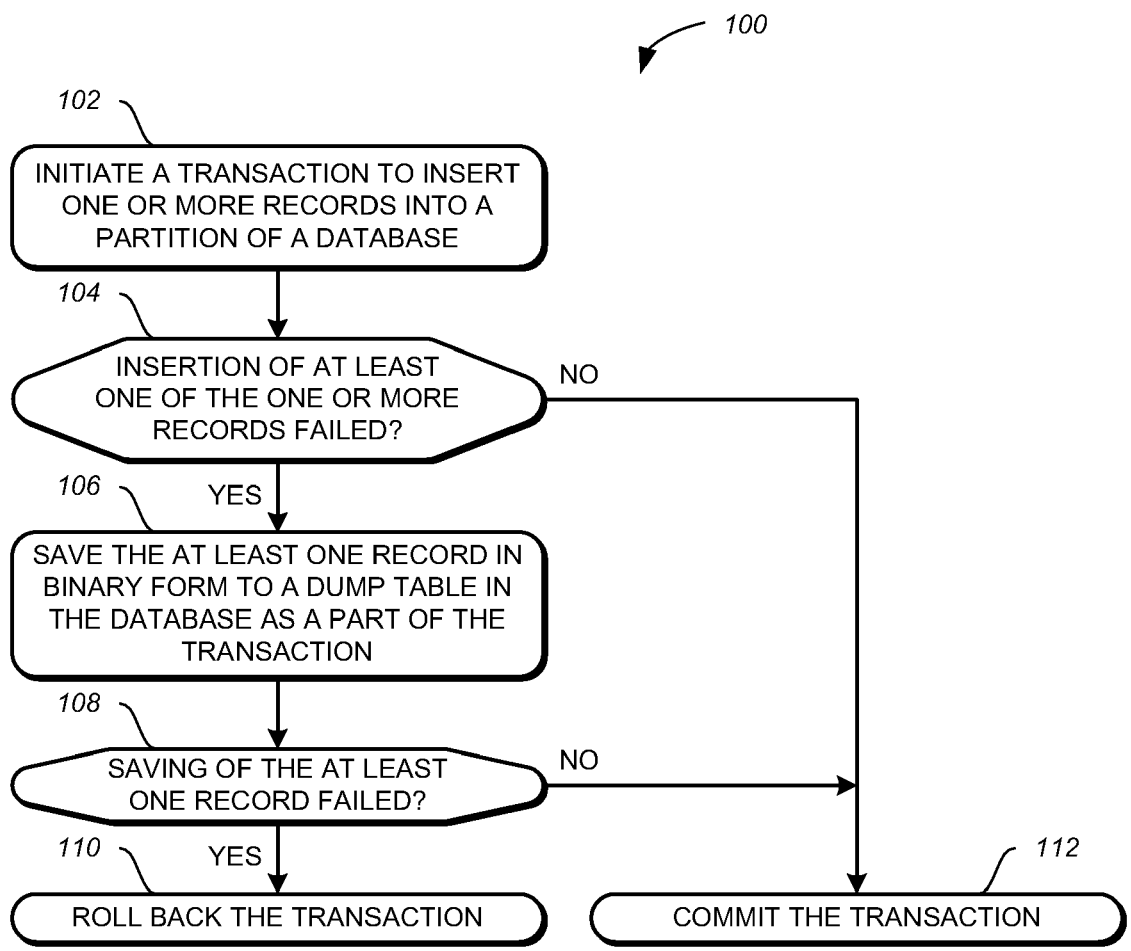
FIG. 1 depicts a process for transferring data to database partitions according to an implementation.

Depicted in FIG. 1 is a process 100 for transferring data to database partitions according to an implementation. At 102, a transaction to insert one or more records into a partition of a database is initiated. The one or more records may be from, for instance, a positional data source (e.g., file), one or more messages in a transactional data source (e.g., queue), or the like.

At 104, a determination is made as to whether insertion of at least one of the one or more records into the partition has failed as a result of the at least one record not satisfying a predetermined condition. The predetermined condition may be, for instance, a table constraint, a data type requirement, a reference link criterion, a conversion format requisite, or the like. Determination of whether insertion of a record has failed may be based on, for instance, a rejection by the database, notification of a rejection by the database, or the like.

If the insertion of at least one of the one or more records into the partition has failed, then, at 106, the at least one record is saved in binary form to a dump table in the database as a part of the transaction. The at least one record is saved in binary form because there is a problem with the at least one record and, as such, the at least one record cannot be saved in whichever form it was supposed to have been inserted into the partition. In one implementation, the dump table is located in the partition.

Each table in the database may have a separate dump table. Hence, the dump table to which the at least one record is saved may depend on which table the at least one record was supposed to have been inserted into. Any record saved to the dump table can be analyzed at a later time to try to fix the problem(s) associated with the record. Once the record is fixed, it can be inserted into the table it was originally destined for.

A determination is made at 108 as to whether saving of the at least one record in binary form to the dump table has failed. The failure may be a result of, for instance, network disconnection, a system crash, an application error, or the like. If the saving of the at least one record has failed, then the transaction is rolled back at 110. However, if each of the one or more records is either successfully inserted into the partition or successfully saved to the dump table, then the transaction is committed at 112.

Since the transaction cannot be committed until each of the one or more records is either successfully inserted into the partition or successfully saved to the dump table, there will not be any data duplication or data loss in the event of a restart. For example, suppose the transaction involves insertion of two records and one of the records is rejected as a "bad" record. If failure occurs after the "good" record is successfully inserted, but before the "bad" record is successfully saved or if failure occurs after the "bad" record is successfully saved, but before the "good" record is successfully inserted, then the whole transaction will be rolled back upon restart as if it never occurred. This prevents duplicate insertions of the "good" record and potential loss of the "bad" record and duplicate savings of the "bad" record and potential loss of the "good" record.

Depending on the type of data source in which the one or more records originated from, the transaction may include additional operations. For example, if the one or more records originated from one or more messages in a transactional data source, then the transaction may include an additional operation of deleting the one or more messages from the transactional data source. As a result, the transaction can only be committed when the one or more messages are successfully deleted from the transactional data source and each of the one or more records is either successfully inserted into the partition or successfully saved to the dump table.

To give another example, if the one or more records originated from a positional data source, then the transaction may also include an operation of storing positional information relating to one of the one or more records in the database. The positional information relating to the one record may include a position of the one record in the positional data source. Hence, the transaction can only be committed when the positional information is successfully stored in the database and each of the one or more records is either successfully inserted into the partition or successfully saved to the dump table.

The one record in which positional information relating thereto is stored may be selected based on the position of the one record in the positional data source. For example, the one record may be at a position farthest from a beginning of the positional data source among the one or more records inserted into the partition. Thus, if the one or more records are inserted into the partition in positional order, then the one record will be the last record inserted.

Figure 2:
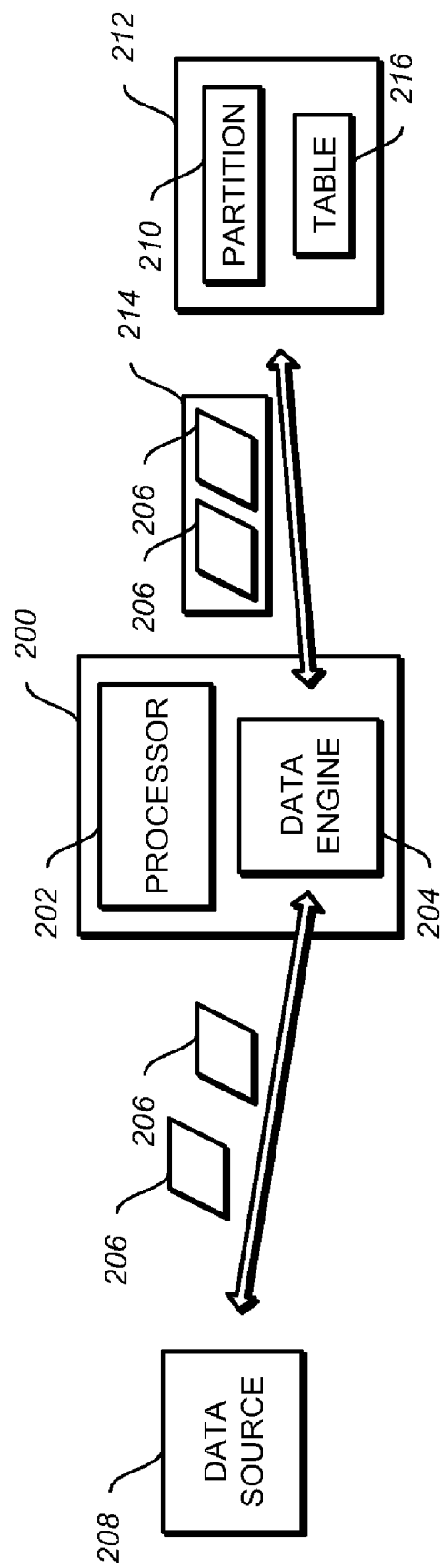
FIG. 2 illustrates a system for transferring data to database partitions according to an implementation.

FIG. 2 illustrates a system 200 for transferring data to database partitions according to an implementation. System 200 includes a processor 202 and a data engine 204 executing on processor 202. Other components (not illustrated) may be included in system 200. For example, system 200 may include memory, hard disk, or the like.

Data engine 204 reads records 206 from a data source 208. Records 206 are to be inserted into a partition 210 of a database 212. Database 212 includes at least one other partition (not illustrated). Data engine 204 then initiates a transaction 214 to insert records 206 into partition 210. In response to insertion of at least one of records 206 into partition 210 having failed as a result of the at least one record 206 not satisfying a predetermined condition, data engine 204 saves the at least one record 206 in binary form to a dump table 216 in database 212 as a part of transaction 214. Although not illustrated as such, dump table 216 may be included in partition 210.

Saving the at least one record 206 in binary form to dump table 216 within transaction 214 ensures that transaction 214 will not be committed at least until the at least one record 206 is saved to dump table 216. Thus, if saving of the at least one record 206 fails, then data engine 204 will roll back transaction 214. This prevents data duplication and loss.

Figure 3:
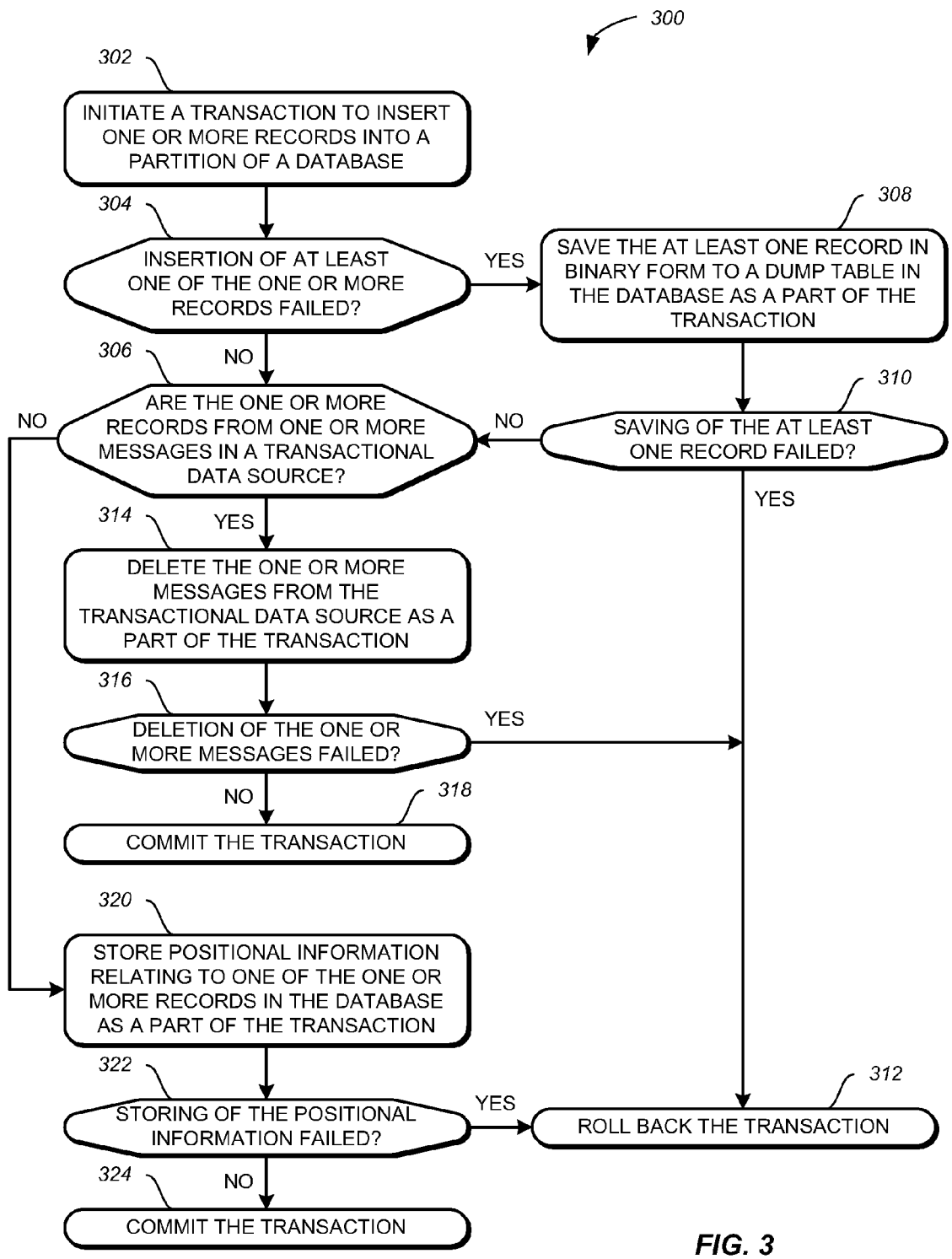
FIG. 3 shows a process for transferring data to database partitions according to an implementation.

Shown in FIG. 3 is a process 300 for transferring data to database partitions according to an implementation. At 302, a transaction is initiated to insert one or more records into a partition of a database. A determination is made at 304 as to whether the insertion of at least one of the one or more records into the partition has failed as a result of the at least one record not satisfying a predetermined condition.

If each of the one or more records is successfully inserted into the partition, then a determination is made at 306 as to whether the one or more records are from one or more messages in a transactional data source. On the other hand, if the insertion of at least one record into the partition failed, then, at 308, the at least one record is saved in binary form to a dump table in the database as a part of the transaction.

A determination is made at 310 as to whether the saving of the at least one record in binary form to the dump table has failed. If the saving of the at least one record has failed, then the transaction is rolled back at 312. However, if the at least one record is successfully saved in binary form to the dump table, then process 300 returns to 306.

If it is determined at 306 that the one or more records are from one or more messages in a transactional data source, then the one or more messages are deleted from the transactional data source as a part of the transaction at 314. A determination is made at 316 as to whether the deletion of the one or more messages from the transactional data source has failed. If the one or more messages are successfully deleted from the transactional data source, then the transaction is committed at 318. Otherwise, the transaction is rolled back at 312.

If it is determined at 306 that the one or more records are not from one or more messages in a transactional data source, then it is assumed that the one or more records are from a positional data source and positional information relating to one of the one or more records is stored in the database as a part of the transaction at 320. The positional information includes a position of the one record in the positional data source.

A determination is made at 322 as to whether the storing of the positional information relating to the one record in the database has failed. If storing of the positional information has failed, then the transaction is rolled back at 312. On the other hand, if the positional information relating to the one record is successfully stored in the database, then the transaction is committed at 324.

Figure 4:
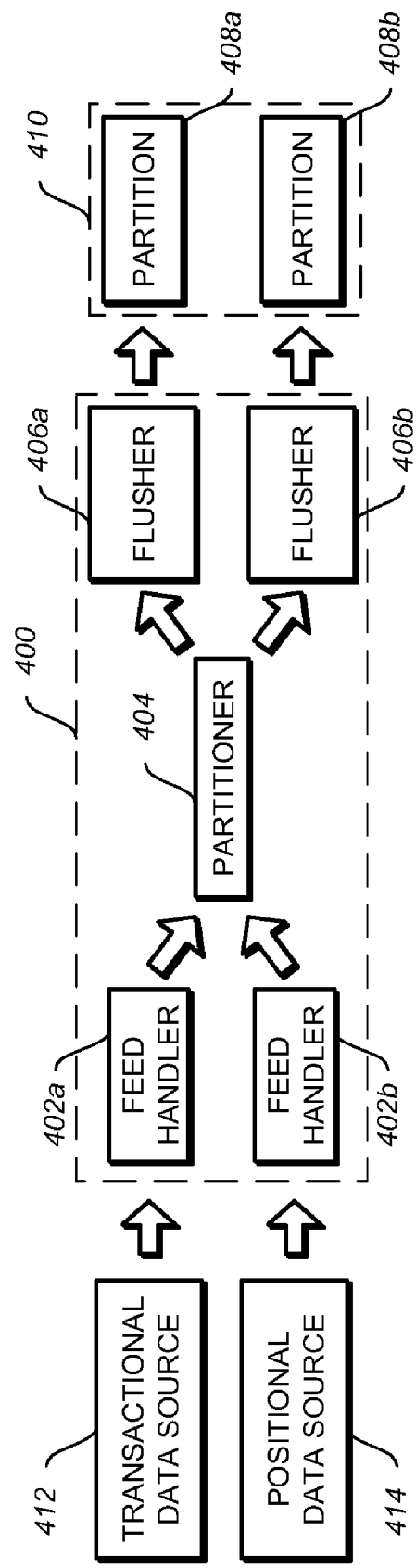
FIG. 4 depicts a system for transferring data to database partitions according to an implementation.

FIG. 4 depicts a system 400 for transferring data to database partitions according to an implementation. System 400 includes feed handlers 402a-402b, a partitioner 404, and flushers 406a-406b. Feed handlers 402a-402b may be combined into a single feed handler in another implementation. Each of the feed handlers 402a-402b, partitioner 404, and flushers 406a-406b can be implemented as an application thread running on system 400 or as hardware components of system 400, such as through ASIC (Application Specific Integrated Circuit). Although not shown, system 400 may include other components.

Each partition 408 is serviced by at least one flusher 406. However, each flusher 406 cannot service more than one partition 408. Thus, if more partitions 408 are added to database 410, then additional flushers 406 will need to be added to system 400. Further, additional flushers 406 may be added to system 400 so that each partition 408 is serviced by more than one flusher 406.

In FIG. 4, feed handler 402a reads one or more records from one or more messages in a transactional data source 412 and feed handler 402b reads one or more records from a positional data source 414. The records read by each feed handler 402 are then forwarded to partitioner 404 to determine which partition 408 each record is supposed to be inserted into. Partitioner 404 directs each record to the flusher 406 servicing the partition 408 the record is to be inserted into. The records may be placed on queues (not depicted) associated with the corresponding flusher 406 to await insertion.

Upon receiving one or more records from partitioner 404, each flusher 406 initiates a transaction to insert the one or more records into the partition 408 serviced by the flusher 406. Depending on where each record came from, the transaction may also include an operation to delete one or more messages from transactional data source 412 and/or an operation to store positional information relating to one of the one or more records in database 410. Regardless of what operations are included in the transaction, flusher 406 cannot commit the transaction until all operations have successfully completed.

If insertion of any record is rejected by database 410, then an additional operation will be added to the transaction to save each rejected record in binary form to a dump table (not depicted) in database 410. When there are multiple rejected records, the rejected records may be saved to different dump tables if, for instance, each table (not depicted) in database 410 has a separate dump table and the rejected records were destined for different tables in database 410.

No transaction will be committed until all operations in the transaction have been successfully completed. This ensures that there will be no data duplication or data loss in the event of a restart after a failure occurs.

This disclosure can take the form of an entirely hardware implementation, an entirely software implementation, or an implementation containing both hardware and software elements. In one implementation, this disclosure is implemented in software, which includes, but is not limited to, application software, firmware, resident software, microcode, etc.

Furthermore, this disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 5:
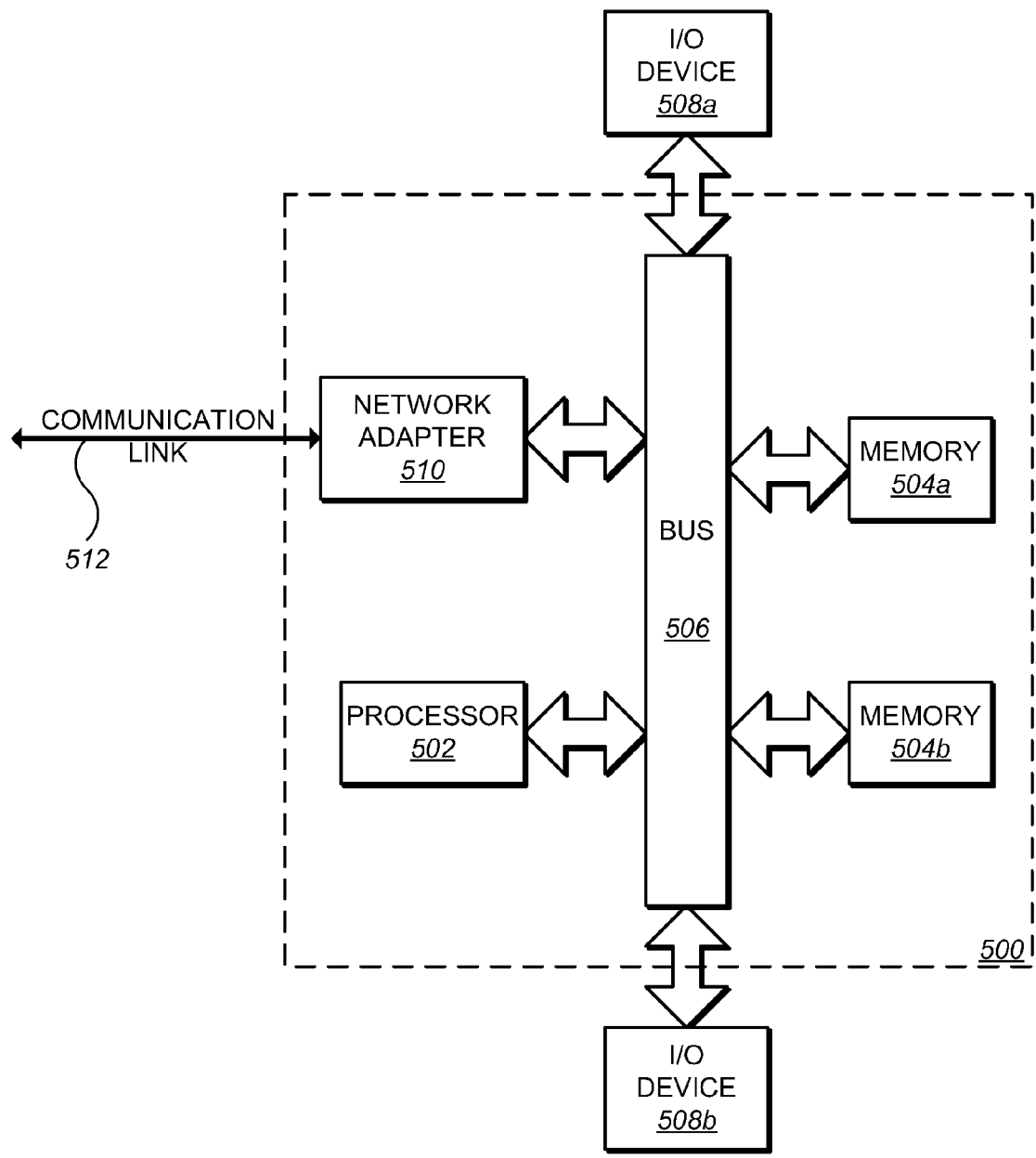
FIG. 5 is a block diagram of a data processing system with which implementations of this disclosure can be implemented.

FIG. 5 depicts a data processing system 500 suitable for storing and/or executing program code. Data processing system 500 includes a processor 502 coupled to memory elements 504a-b through a system bus 506. In other implementations, data processing system 500 may include more than one processor and each processor may be coupled directly or indirectly to one or more memory elements through a system bus.

Memory elements 504a-b can include local memory employed during actual execution of the program code, bulk storage, and cache memories that provide temporary storage of at least some program code in order to reduce the number of times the code must be retrieved from bulk storage during execution. As shown, input/output or I/O devices 508a-b (including, but not limited to, keyboards, displays, pointing devices, etc.) are coupled to data processing system 500. I/O devices 508a-b may be coupled to data processing system 500 directly or indirectly through intervening I/O controllers (not shown).

In the implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

While various implementations for handling transfer of bad data to database partitions in restartable environments have been described, the technical scope of this disclosure is not limited thereto. For example, this disclosure is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of this disclosure.

The invention claimed is:

1. A method for transferring data to database partitions, the method comprising:

performing a transaction to insert one or more records into a partition of a database, by operation of one or more computer processors;

upon determining that the insertion of the one or more records into the partition has failed as a result of the one or more records not satisfying a predetermined condition, saving at least one of the one or more records in binary form to a dump table in the database; and upon determining that the saving of the at least one record to the dump table in binary form has failed, rolling back the transaction.

2. The method of claim 1, wherein the one or more records are from one or more messages in a transactional data source and the method further comprises:

deleting the one or more messages from the transactional data source as a part of the transaction; and rolling back the transaction responsive to the deletion of the one or more messages from the transactional data source having failed.

3. The method of claim 2, further comprising:

committing the transaction only when the one or more messages are successfully deleted from the transactional data source and each of the one or more records is either successfully inserted into the partition or successfully saved to the dump table.

4. The method of claim 1, wherein the one or more records are from a positional data source and the method further comprises:

storing positional information relating to one of the one or more records in the database as a part of the transaction, the positional information comprising a position of the one record in the positional data source; and rolling back the transaction responsive to the storing of the positional information relating to the one record in the database having failed.

5. The method of claim 4, further comprising:
committing the transaction only when the positional information relating to the one record is successfully stored in the database and each of the one or more records is either successfully inserted into the partition or successfully saved to the dump table.

6. The method of claim 1, wherein the at least one record is saved in binary form to the dump table associated with a table in which insertion of the at least one record into the table failed.

7. The method of claim 1, wherein the predetermined condition is one of a table constraint, a data, type requirement, a reference link criterion, and a conversion format requisite.

8. A system for transferring data to database partitions, the system comprising:
a processor; and
a memory containing a program that, when executed on the computer processor, performs an operation comprising:
performing a transaction to insert one or more records into a partition of a database;
upon determining that the insertion of the one or more records into the partition has failed as a result of the one or more records not satisfying a predetermined condition, saving at least one of the one or more records in binary form to a dump table in the database; and
upon determining that the saving of the at least one record to the dump table in binary form has failed, rolling back the transaction.

9. The system of claim 8, wherein the one or more records are from one or more messages in a transactional data source and the operation further comprising:
deleting the one or more messages from the transactional data source as a part of the transaction; and
rolling back the transaction responsive to the deletion of the one or more messages from the transactional data source having failed.

10. The system of claim 9, the operation further comprising:
committing the transaction only when the one or more messages are successfully deleted from the transactional data source and each of the one or more records is either successfully inserted into the partition or successfully saved to the dump table.

11. The system of claim 9, wherein the one or more records are from a positional data source and the operation further comprises:
storing positional information relating to one of the one or more records in the database as a part of the transaction, the positional information comprising a position of the one record in the positional data source, and
rolls back the transaction responsive to the storing of the positional information relating to the one record in the database having failed.

12. The system of claim 11, the operation further comprising:
committing the transaction only when the positional information relating to the one record is successfully stored in the database and each of the one or more records is either successfully inserted into the partition or successfully saved to the dump table.

13. The system of claim 8, wherein the at least one record is saved in binary from to the dump table associated with a table in which insertion of the at least one record into the table failed.

14. The system of claim 8, wherein the predetermined condition is one of a table constraint, a data type requirement, a reference link criterion, and a conversion format requisite.

15. A computer program product comprising a computer readable medium encoded with a computer program for transferring data to database partitions, wherein the computer program, when executed on a computer, causes the computer to:
perform a transaction to insert one or more records into a partition of a database;
upon determining that the insertion of the one or more records into the partition has failed as a result of the one or more records not satisfying a predetermined condition, save at least one of the one or more records in binary form to a dump table in the database; and
upon determining that the saving of the at least one record to the dump table in binary form has failed, roll back the transaction.

16. The computer program product of claim 15, wherein the one or more records are from one or more messages in a transactional data source and the computer program further causes the computer to:
delete the one or more messages from the transactional data source as a part of the transaction; and
roll back the transaction responsive to the deletion of the one or more messages from the transactional data sources having failed.

17. The computer program product of claim 16, wherein the computer program further causes the computer to:
commit the transaction only when the one or more messages are successfully deleted from the transactional data source and each of the one or more records is either successfully inserted into the partition or successfully saved to the dump table.

18. The computer program product of claim 15, wherein the one or more records are from one or more messages in a transactional data source and the computer program further causes the computer to:
store positional information relating to one of the one or more records in the database as a part of the transaction, the positional information comprising a position of the one record in the positional data source; and
roll back the transaction responsive to the storing of the positional information relating to the one record in the database having failed.

19. The computer program product of claim 18, wherein the computer program further causes the computer to:
commit the transaction only when the positional information relating to the one record is successfully stored in the database and each of the one or more records is either successfully inserted into the partition or successfully saved to the dump table.

20. The computer program product of claim 15, wherein the at least one record is saved in binary form to the dump table associated with a table in which insertion of the at least one record into the table failed.

* * * * *